United States Patent [19]
Murphy

[11] 4,175,765
[45] Nov. 27, 1979

[54] PARALLEL HITCH FOR A BELLY MOUNTED TRACTOR APPLIANCE

[75] Inventor: George W. Murphy, Hopewell, Ohio

[73] Assignee: Dura Corporation, Southfield, Mich.

[21] Appl. No.: 905,779

[22] Filed: May 15, 1978

[51] Int. Cl.² .................................. A01D 35/12
[52] U.S. Cl. ............................ 280/460 A; 56/15.8; 172/298
[58] Field of Search ............ 180/461 A, 460 A; 56/15.8, 15.9, 16.3; 172/303, 306, 307, 800, 297, 298, 299

[56] References Cited
U.S. PATENT DOCUMENTS 2,361,122  10/1944  Raney ........................ 172/303 X
2,673,509  3/1954  Wilson ........................ 280/460 A Primary Examiner—John A. Pekar
Attorney, Agent, or Firm—Hill, Van Santen, Steadman, Chiara & Simpson

[57] ABSTRACT

Differential length parallel lift arms have means at one end for attachment to a belly mounted tractor appliance. At their opposite ends the lift arms are adapted to be pivotally mounted on a common axis on a tractor under which the appliance is adapted to be located. Lift arm actuating means are connected to the lift arms for effecting substantially parallel lifting of the appliance by the arms. Means for effecting operation of the actuating means may be operated hydraulically or otherwise from the tractor seat.

7 Claims, 2 Drawing Figures

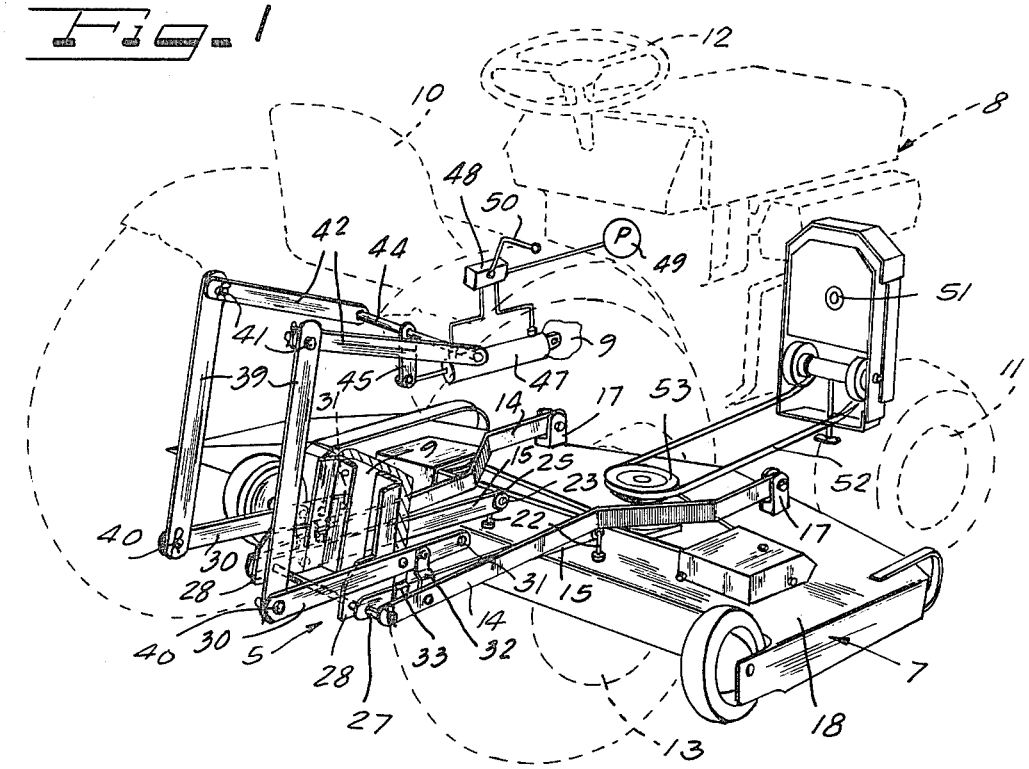
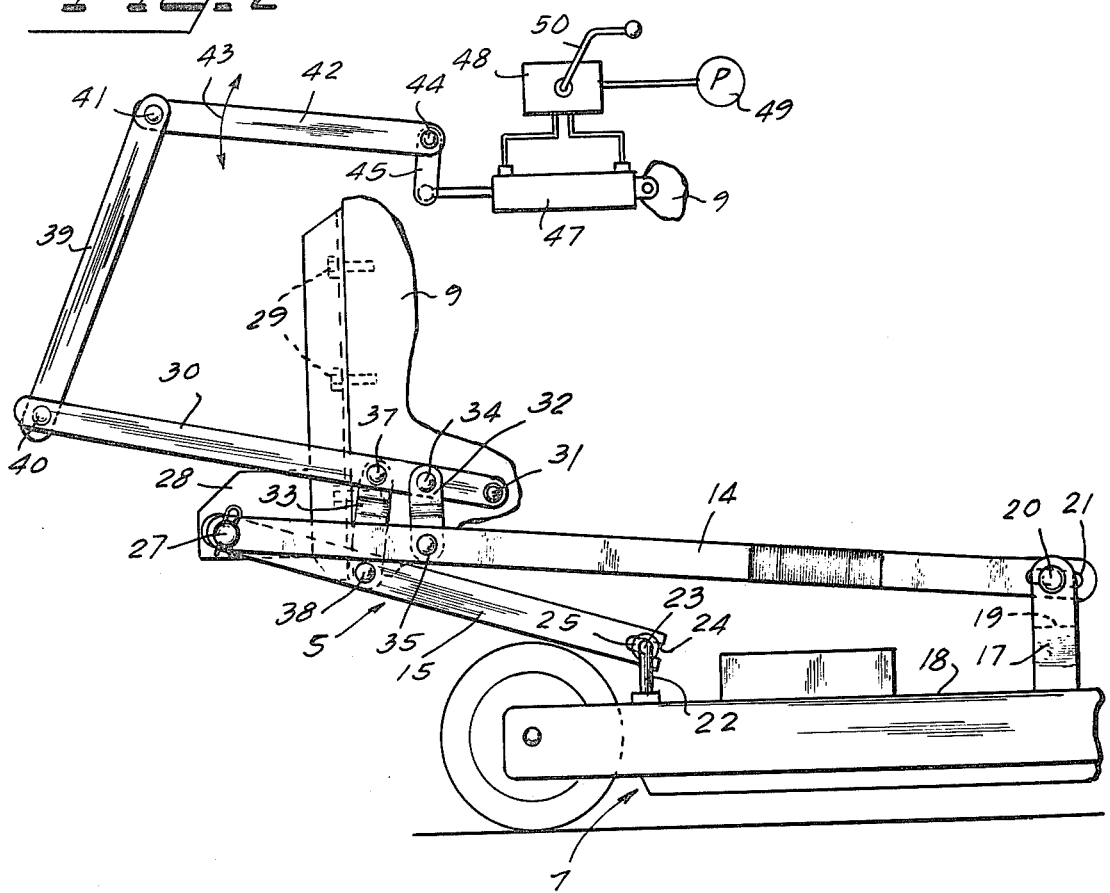

PARALLEL HITCH FOR A BELLY MOUNTED TRACTOR APPLIANCE

This invention relates to the art of mounting belly mounted tractory appliances and is more particularly concerned with a new and improved parallel lift hitch for this purpose.

Various arrangements for mounting appliances such as rotary mowers under tractors for control from the drivers seat have been proposed. Conventionally lifting of the appliance is effected by a generally scissors linkage and control lever means are carried by the appliance for operating the scissors linkage. The control lever provides an obstruction which can be a nuisance under some conditions. Prior arrangements have also involved some complexities of structure and have required special attachments on the associated tractor for mounting the apparatus.

An important object of the present invention is to provide a new and improved parallel lift hitch for a belly mounted tractor appliance which will overcome the disadvantages, drawbacks, inefficiencies, shortcomings and problems inherent in prior constructions and which will provide an efficient, rugged, simple and economical structure for the purpose intended.

A parallel lift hitch for a belly mounted tractor appliance, embodying principles of the invention, comprises differential length parallel lift arms having means at one end for articulated attachment to a belly mounted tractor appliance, means for pivotally mounting the opposite ends of the lift arms on a common axis on a tractor under which the appliance is adapted to be located, lift arm actuating means, means connecting the actuating means to the lift arms near said opposite ends for effecting through operation of said actuating means substantially parallel lifting of the appliance by said arms, and means for effecting operation of the actuating means and thereby actuation of the parallel lift arms for adjusting the position of the appliance relative to the underside of the tractor. More particularly, the means for effecting operation of the linkage may comprise hydraulic actuation means permitting lifting adjustment of the appliance infinitely throughout a substantial range.

Other objects, features and advantages of the invention will be readily apparent from the following description of a certain representative embodiment thereof, taken in conjunction with the accompanying drawing although variations and modifications may be effected without departing from the spirit and scope of the novel concepts enbodied in the disclosure and in which:

FIG. 1 is a schematic perspective view showing a hitch embodying features of the invention adapted for mounting and controlling operation of a rotary mower under a tractor;

FIG. 2 is an illustrative fragmentary side elevational view showing the hitch.

A parallel lift hitch 5 embodying principles of the invention is illustrated in FIGS. 1 and 2 in association with a belly mounted appliance 7 comprising by way of illustration a rotary mower mounted under a self-propelled tractor 8 which for illustrative purposes has been shown largely in phantom outline. The tractor 8 comprises a body frame 9 supporting a drivers seat 10 and has steerable front wheels 11 adapted to be steered by a steering wheel 12 in front of the drivers seat 10 while rear wheels 13 cooperate with the front wheels 11 to support the tractor body frame 9 at a suitable elevation permitting mounting of the belly mounted appliance 7 under the tractor between the front steering wheels 11 and the rear wheels 13.

The construction and arrangement of the parallel lift hitch 5 is preferably such that it can be operated at the rear of the tractor 8. For this purpose, differential length parallel lift arms comprising a pair of similar long arms 14 and a pair of similar short arms 15 are constructed and arranged for articulated attachment at one of their ends, herein their front ends, to the appliance 7, and for pivotal mounting at their opposite end to the tractor frame 9. Articulated attachment of the front ends of the long arms 14 to the appliance 7 is adapted to be effected by means of rigid upstanding clevis-like anchor posts 17 at suitably laterally spaced locations on the front end portion of a deck 18 of the appliance. Each of the anchor posts 17 has an upwardly opening slot 19 within which the front end portion of the associated arm 14 is freely received and connected in articulated relation by means of a pivot pin 20 carried by the post 17 across the slot 19 and extending through a bearing hole 21 in the arm and elongated a limited extent longitudinally of the arm for lost motion clearance. Means for articulated attachment of the front end portions of the short arms 15 to the rear portion of the appliance deck 18 may comprise respective fixed journal posts 22 each of which has a horizontal journal head 23 extending into a bearing slot 24 opening through the end of the arms 15. A retaining washer 25 is mounted on the distal end portion of the journal head 23 in each instance. To facilitate substantially parallel lifting of the appliance 7, the long arm journal pins 20 are located at a higher elevation than the short arm journals 23, in the present instance in a ratio of about 2 to 1 relative to a flat plane across the top of the deck 18.

From their front end articulated attachments, the arms 14 and 15 extend beyond the rear end of the appliance 17 and converge generally upwardly to pivotal mounting means comprising an axle rod 27 mounting the rear ends of the lift arms on a common axis on the tractor 5, and more particularly the tractor frame 9. In this instance, the common axle 27 is mounted at a suitable elevation and on a fixed axis on spaced brackets 28 located between the pairs of lift arms 14 and 15 at each side of the assembly. The brackets 28 may be secured to the tractor frame 9 by means of bolts 29.

Means for actuating the lift arms 14,15, comprise a lever 30 at each side operatively mounted in a front to rear direction spaced above the axle 27 in a front to rear vertical plane extending between the rear end portions of the respective pairs of arms 14,15. At their front ends, the levers 30 are pivotally mounted on fixed pivots 31 on a common axis spaced forwardly and above the elevation of the axle 27 sufficiently to accommodate an actuating link 32 between the arm 14 and the lever 30 in adjacent spaced relation to the lever pivot 31 and an actuating link 33 connecting the arm 15 with the lever 30 in rearwardly adjacent spaced relation relative to the link 32. A fixed pivot 34 connects the link 32 to the lever 30 and a fixed pivot 35 connects the link 32 to the arm 14 in each of the arm-lever-link assemblies. A fixed pivot 37 connects the link 33 to the lever 30, and a fixed pivot 38 connects the link 33 to the arm 15 in each of the arm-lever-link assemblies.

From the front end pivot 31, each of the levers 30 extends rearwardly beyond the axle 27 and is connected to means for effecting operation of the actuating lever and link means. In this instance, the operation effecting means comprises an upstanding operating link 39 connected at its lower end to the rear end of the lever 30 by means of a fixed pivot 40 in each assembly, and connected by means of a fixed pivot 41 at its upper end to an actuating arm 42 adapted to be mechanically or hydraulically driven through a pivotal range indicated by the arrow 43 to effect raising or lowering of the appliance 7 by means of the parallel lift hitch 5. In a desirable arrangement, the arms 42 are fixed to a shaft 44 pivotally mounted on the tractor frame 9 and having a crank arm 45 extending radially therefrom and operatively attached to a hydraulic actuator 47 connected through a control valve 48 with a hydraulic source pump 49, the valve 48 being controllable by means of a control lever 50 mounted in a convenient location on the tractor handy for convenient manipulation from the drivers seat 10. An advantage of the hydraulic actuator 47 is that thereby the parallel lift hitch can be operated to control the lift position of the appliance 7 through infinitely incremental stages throughout a substantial lift range for the hitch.

It will be observed that the relative lengths of the lift arms 14 and 15, and there convergent relationship toward the shaft axle 27, the relative heights of the front pivots for the arms 14 and 15 and the height of their rear pivot, the lengths and location of the links 32 and 33, the length and mounting of the lever 30, and the length and relationship of the operating link 39 to the levers 30 and to the operating arms 42 are all selected for the particular size of the equipment, i.e., the appliance 7 and the tractor 8, to effect substantially parallel lifting of the appliance 7 throughout the lifting range.

Where the appliance 7 is a rotary mower as shown, one or more rotary blades for the mower are adapted to be driven from a power take-off 51 coupled to the power source of the tractor and driving a flexible belt 52 which is trained about and adapted to rotatably drive a pulley 53 mounted above the deck 18 and suitably drivingly connected with the rotary blades of the mower.

It will be understood that variations and modifications may be effected without departing from the spirit and scope of the novel concepts of this invention:

I claim as my invention:

1. In combination with a tractor,
    a belly mounted appliance having an upper flat plane horizontal deck with upstanding clevis-like anchor post means at one end in which is supported pivot pin means and
    upstanding journal post means at its opposite end and having horizontal journal head means supported thereby,
    an axle rod fixed on the tractor and disposed in spaced relation to said appliance,
    first lever arm means pivotally connected to said axle rod and having a lost motion connection to said clevis-like anchor post means at said pivot pin means,
    second lever arm means shorter than said first lever arm means and pivotally connected to said axle rod and having a bearing slot engaging said journal post means at said journal head means,
    and power operated actuation means for lifting said first and second lever arm means comprising a leverage system connected to said tractor and having a third lever arm means pivotally connected to a fixed point on the tractor above said first and second lever arm means between said axle rod and said journal post means,
    and first and second link means between said third lever arm means and said first and second lever arm means, respectively,
    whereby operation of the actuation means will actuate said leverage system and through said link means will lift the appliance while keeping said horizontal deck generally level.

2. In combination with a tractor as defined in claim 1, said anchor post journal pin being located at a higher elevation than said horizontal journal head in a ratio of about 2 to 1 relative to said horizontal deck.

3. In combination with a tractor as defined in claim 2, said first link means being shorter than said second link means.

4. In combination with a tractor and a belly mounted appliance:
    a parallel lift hitch comprising a first pair of long parallel lift arms;
    means attaching one end of said long arms in articulated relation to one end of said appliance;
    a second pair of short parallel lift arms, means attaching one end of said short arms in articulated relation to the opposite end of said appliance,
    means pivotally mounting the opposite ends of said lift arms on a common axis on said tractor;
    actuating means connected to said lift arms near said opposite ends for effecting through operation of said actuating means substantially parallel lifting of the appliance by said arms;
    and means carried by the tractor for effecting operation of said actuating means and thereby actuation of said parallel lift arms for adjusting the position of the appliance relative to the underside of the tractor,
    said lift arms coverging generally upwardly beyond one end of the appliance to said means pivotally mounting the opposite ends of the lift arms on a common axis on the tractor, said lift arm actuating means including lever structure and having means pivotally mounting an end of the lever structure in generally overlying relation to said lift arms, a relatively short link connecting the lever means to said first long lift arms and a relatively longer link connecting said second short life arms to the lever means, the opposite end of the lever means extending substantially beyond the means pivotally mounting the opposite ends of the lift arms, and actuator means carried by the tractor and connected to said opposite end of the lever means for rocking the lever means about its pivoted end for thereby actuating said lift arms for adjusting the position of the appliance relative to the underside of the tractor.

5. A combination according to claim 4, wherein said actuator means is a hydraulic actuator, a crank arm mounted on said tractor and connected to said hydraulic actuator for actuation by the actuator, and a transmission link connecting the crank arm with said lever structure.

6. A combination according to claim 4, wherein said means for pivotally mounting the opposite ends of said lift arms on said tractor comprise an axle shaft, and bracket means attached to the tractor and mounting said axle shaft.

7. A combination according to claim 4, wherein said means for attaching one end of said long arms in articulated relation to said appliance comprise transversely extending journals, and said one end of said long arms having lost motion bearing means engaging said journals.

* * * * *